US 6,736,727 B1

(12) United States Patent
Doi et al.

(10) Patent No.: US 6,736,727 B1
(45) Date of Patent: May 18, 2004

(54) SERVICE SYSTEM AND SERVICE METHOD EMPLOYING PORTABLE TERMINAL

(75) Inventors: Miwako Doi, Kawasaki (JP); Hiroshi Sugiyama, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 131 days.

(21) Appl. No.: 09/716,317

(22) Filed: Nov. 21, 2000

(30) Foreign Application Priority Data

Nov. 22, 1999 (JP) .......................................... 11-331973

(51) Int. Cl.[7] ................................................ A63F 13/00
(52) U.S. Cl. ........................................................ 463/42
(58) Field of Search ............................... 463/1, 24, 30, 463/37, 39, 41–45, 47; 345/1, 3, 5, 50, 133, 169, 213, 329, 520, 521; 705/7, 10, 14, 16

(56) References Cited

U.S. PATENT DOCUMENTS

| 4,725,977 | A | * | 2/1988 | Izumi et al. ............. 379/93.12 |
| 4,876,592 | A | * | 10/1989 | Von Kohorn ............. 379/92.01 |
| 6,091,956 | A | * | 7/2000 | Hollenberg .................. 455/456 |
| 6,327,570 | B1 | * | 12/2001 | Stevens ........................ 705/10 |
| 6,381,465 | B1 | * | 4/2002 | Chern et al. ................ 340/7.21 |
| 6,385,591 | B1 | * | 5/2002 | Mankoff ....................... 705/14 |
| 6,392,613 | B1 | * | 5/2002 | Goto ............................ 463/44 |

* cited by examiner

*Primary Examiner*—Michael O'Neill
(74) *Attorney, Agent, or Firm*—Oblon, Spivak, McClelland, Maier & Neustadt, P.C.

(57) ABSTRACT

This service system includes a portable terminal for acquiring a game character to be distributed, and then, executing a game in collaboration with a processor main body, an external station for making communication with the portable terminal via a short distance wireless equipment, and a service server for distributing the game character to the external station. The portable terminal transmits to the external station the contents of a history information storage section for storing history information concerning a game and a game character depending on a user that possesses the portable terminal. The external station receives the history information transmitted from the portable terminal, and then transmits to the portable terminal the game character information transmitted by referring to the history.

6 Claims, 8 Drawing Sheets

| .......... | .......... | .......... | .......... | .......... |
|---|---|---|---|---|
| CHARACTER TYPE | α1 | α2 | α3 | .......... |
| DATE OF QUALIFICATION | 99/10/27 | .......... | .......... | .......... |
| NUMBER OF ACCESSED EXTERNAL STATIONS | 2 | .......... | .......... | .......... |

FIG. 5A

| .......... | .......... | .......... | .......... | .......... |
|---|---|---|---|---|
| CHARACTER TYPE | α1 | α2 | α3 | .......... |
| DATE OF QUALIFICATION | 99/10/27 | .......... | .......... | .......... |
| NUMBER OF ACCESSED EXTERNAL STATIONS | 2 | .......... | .......... | .......... |
| EXTERNAL STATION LIST | (P1, P2) | .......... | .......... | .......... |

FIG. 5B

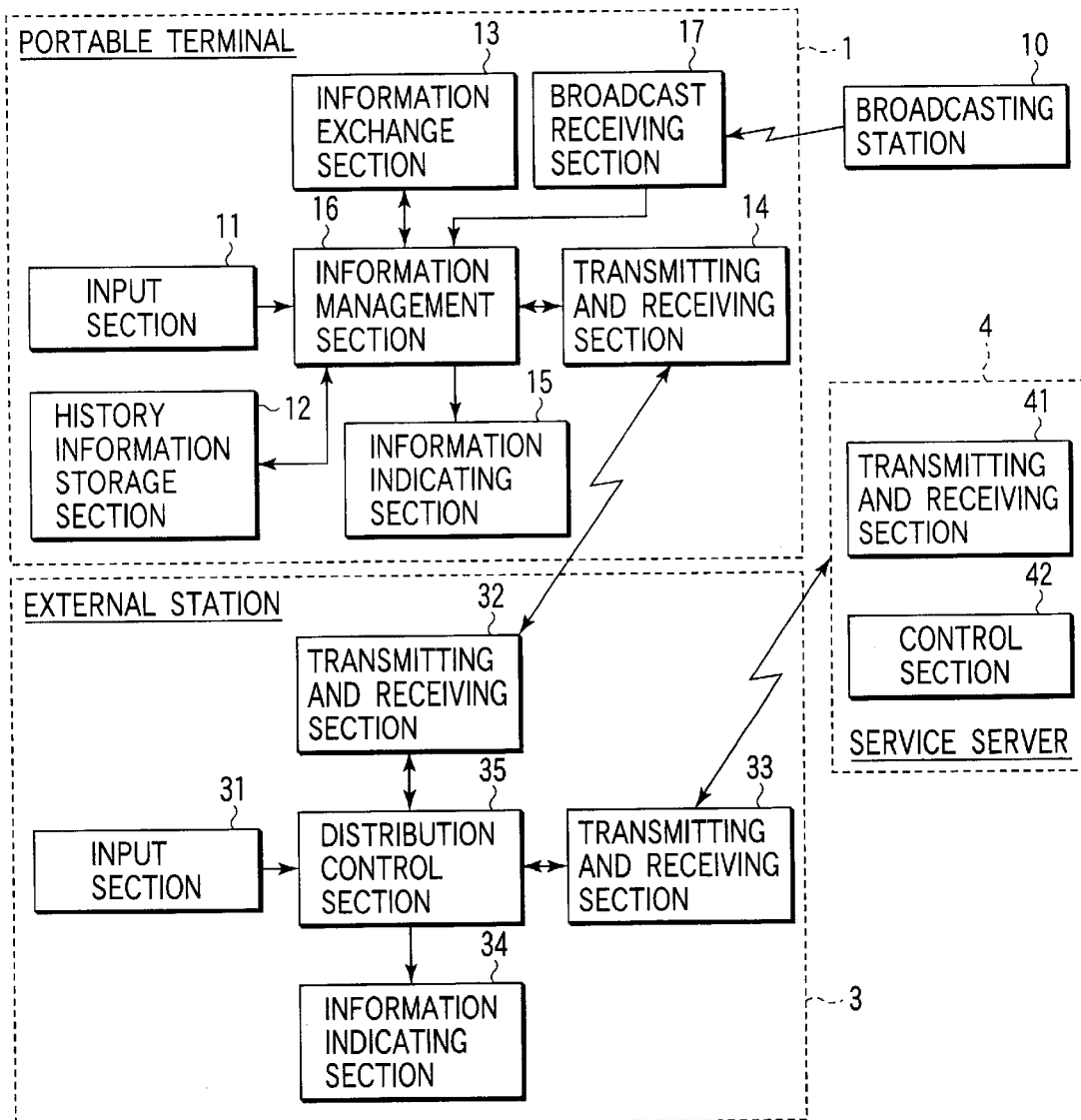
F I G. 9

SERVICE SYSTEM AND SERVICE METHOD EMPLOYING PORTABLE TERMINAL

CROSS-REFERENCE TO RELATED APPLICATIONS

This application is based upon and claims the benefit of priority from the prior Japanese Patent Application No. 11-331973, filed Nov. 22, 1999, the entire contents of which are incorporated herein by reference.

BACKGROUND OF THE INVENTION

The present invention pertains to a service system that acquires service information such as game characters by means of a portable terminal, thereby performing processing such as game. In particular, the present invention relates to a service system and service method designed so as to promote outgoing for a user who possesses the portable terminal.

In a game machine for home use, a user mounts a storage medium such as CD-ROM in which game software is stored in a game machine mainframe, thereby enjoying a game. History information depending on individual users such as a game in progress is stored in a storage medium such as a memory card independent of such storage medium as CD-ROM storing game software. For example, information such as weapons or characters that are available by being acquired through a match play game is also stored in this memory card. In addition, recently, by storing game software in a memory card, a user can enjoy a game easily even in a car or any location where a game machine mainframe cannot be used. Further, the user connects a game machine to a telephone line, and downloads game software, whereby the user can enjoy a match play game.

The game software used in such game machine can be purchased at various locations such as game shop, game selling corner at department store or the like, and shopping station in a convenience store. However, in some types of game software, all of the game characters used here cannot be always purchased at a general selling corner. Thus, there is proposed a sales strategy in which a system for selling a specific game character at an event space or through communication selling only is established, thereby enhancing the value of the game. As a result, there is a problem that many users that a promoter cannot expect gather and make a long line at such event location, and the promoter cannot treat such plenty of users satisfactorily.

In addition, there is a problem that the user continues playing a game to clear (end) the game at midnight or by sitting up through the night, and as a result of this, a student is absent from school or a worker is absent from office. That is, in playing a conventional game machine, a user continuously sits at the game machine and looks at the display all the times.

Further, in selling the game characters in the aforementioned event location as well, there occurs a case in which a person who wants to purchase the game continuously playing a game by a portable type game machine while he or she is waiting.

As described above, in the current use mode of the game machine, there is a large disadvantage that a user is likely to continue a game at home for a long time from the start to the end without outgoing, thus causing disordered daily life or shortage of exercise.

In addition, in selling game characters utilizing an event location, users gather at one part, and must wait for a long time, which is inefficient for users or game sellers. On the other hand, if such game characters can be purchased anywhere, its added value is lost for the users or game sellers.

BRIEF SUMMARY OF THE INVENTION

The present invention has been made in order to solve the aforementioned problem with the use of a game machine. It is an object of the present invention to provide a service system and service method employing a portable terminal designed to promote outgoing.

In order to solve the foregoing problem, a service system according to the present invention comprises a portable terminal configured to acquire predetermined service information to be distributed, and then execute predetermined processing solely or in collaboration with an external device and an external station configured to make communication with the portable terminal when the portable terminal is close.

In addition, according to a service method in such service system comprising a portable terminal for acquiring predetermined service information to be distributed, and then, executing predetermined processing solely or in collaboration with an external device and an external station for making communication with the portable terminal when the portable terminal is close, history information depending on a user who possesses the portable terminal is stored by means of the portable terminal; the stored history information is transmitted to the external station by means of the portable terminal; the history information transmitted from the portable terminal is received by the external station, the history information is referred to by the external station, and the service information is transmitted and distributed to the portable terminal.

Communication between a portable terminal and an external station is made via a short distance wireless equipment known as Bluetooth.

Then, the portable terminal stores history information depending on a user who possesses the portable terminal, and transmits the history information to an external station. In addition, the external station receives the history information transmitted from the portable terminal, refers to the history information, and transmits and distributes service information to the portable terminal.

Specifically, for example, in the case where service information includes game characters, the portable terminal acquires game character information to be distributed, and executes the game solely or in collaboration with the game machine mainframe. Then, the portable terminal stores history information concerning a game depending on a user who possesses the portable terminal and game characters, and transmits the information to an external station. On the other hand, the external station receives history information transmitted from the portable terminal, refers to the history information, and transmits and distributes game character information to the portable terminal.

In addition, in the case where service information includes coupon information, a portable terminal receives coupon information from another portable terminal for acquiring such coupon information to be distributed. Then, the portable terminal acquires coupon information depending on a user who possesses the portable terminal, stores history information concerning application for coupon, and transmits the history information to an external station.

The external station refers to the history information transmitted from the portable terminal, and transmits and distributes coupon information to the portable terminal.

With such system configuration, a user takes a portable terminal, and goes to a location that enables communication with an external station, whereby the user can receive distribution of service information such as game characters or coupon, thus making it possible to prompt the user to go out positively.

Another service system according to the present invention includes: a portable terminal configured to acquire predetermined service information to be distributed, and then execute predetermined processing solely or in collaboration with an external device; an external station that makes communication with the portable terminal when this portable terminal is close; and a broadcast station configured to broadcast service information to distribute it to a portable terminal. In this case as well, communication between a portable terminal and an external station is made via a short distance wireless equipment.

Then, a portable terminal stores history information depending on a user who possesses the portable terminal, and transmits the history information to an external station. The external station receives history transmitted from the portable terminal, refers to the history information, and execute predetermined service.

Thus, a broadcast station distributes service information to each portable terminal, and an external station executes service, whereby many users can receive service information simultaneously. Moreover, the user must go to an external station that enables communication with the portable terminal in order to receive the service. This makes it possible to prompt the user to go out, to provide service information inexpensively at a service provider side, and to accelerate sales at shop with a low cost.

A portable terminal or an external device desirably includes a function for instructing the user to acquire service information such as game character information or coupon information when a predetermined condition is met. This makes it possible to prompt the user to go to an external station in order to receive the distribution of service information to be acquired.

In addition, a portable terminal or an external device may comprise a function for indicating the user an external station at which the portable terminal can acquire service information such as game character information or coupon information, for example, the nearest external station. In this manner, the user can acquire service information efficiently.

An external station may comprise a function for transmitting to a portable terminal the guidance information for indicating anther external station at which a portable terminal can acquire service information such as game character information or coupon information. This makes it possible to provide the user with game-like entertainment in acquiring service information by the user going to a plurality of such presented external stations.

A service system employing a portable terminal according to the present invention further comprises a service server configured to distribute service information to an external station, wherein service information may be distributed adaptively (to a person who visits an external station) under the control of this service server based on at least one of connection information on a portable terminal that has provided an access to the external station and history information transmitted from the portable terminal to the external station.

In this manner, in a service server, distribution and delivery control of service information such as game characters is performed for a portable terminal according to regional congestion state or history information between the portable terminal and an external station, whereby service information such as game characters to be distributed from the external station to the portable terminal can be properly distributed to the external station. Alternatively, the history is provided from the portable terminal via the external station, thereby making it possible to change adequate service activities.

In addition, according to the present invention, there is provided a portable terminal comprising:

a history information memory configured to store history information depending on a user who possesses a portable terminal as a portable terminal for acquiring predetermined service information to be distributed, and then to execute predetermined processing solely or in collaboration with an external device; and a transmitter configured to externally transmit the history information stored in the history information memory.

Further, according to the present invention, there is provided a service information distributing apparatus comprising: a receiver configured to receive history information transmitted from a portable terminal for acquiring predetermined service information to be distributed, and then, to execute predetermined processing solely or in collaboration with an external device; and a transmitter configured to transmit and distribute to the portable terminal, service information by referring to the history information received by the receiver.

Furthermore, according to the present invention, the flow of customers in a region is guided by coupon distribution or advertisement distribution and the like by utilizing the face that a user can be prompted for physical movement at the outside, thereby making it possible to accelerate product selling.

Moreover, according to the present invention, broadcasting service is used for distributing service information such as advertisement or coupon, whereby service information can be distributed to many users inexpensively, and thus, the cost associated with promotion of sales at regional shops can be significantly reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A and 5B are views showing an example of the storage content of the history information storage section according to the same embodiment;

FIG. 9 is a block diagram depicting a detailed configuration of the service system according to the same embodiment.

DETAILED DESCRIPTION OF THE INVENTION

Hereinafter, embodiments of the present invention will be described with reference to the accompanying drawings.

Figure 1:
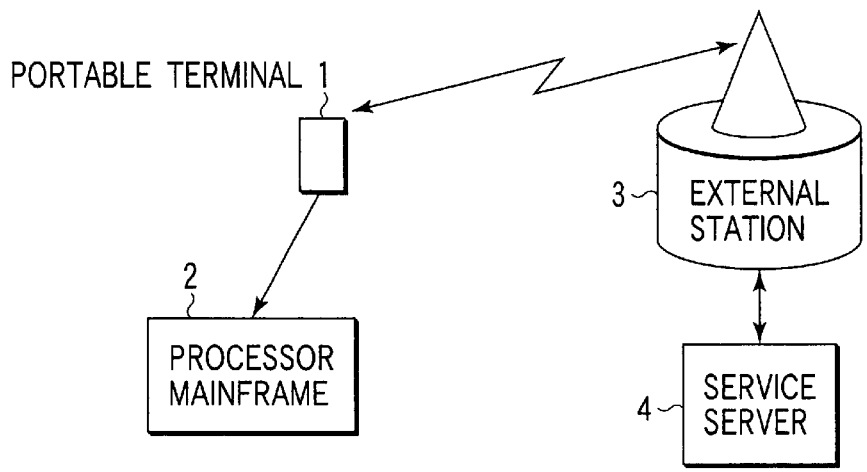
FIG. 1 is a view showing a schematic configuration of a service system employing a portable terminal according to a first embodiment of the present invention.

(First Embodiment) FIG. 1 shows a schematic configuration of an entire service system employing a portable terminal according to a first embodiment of the present invention. This service system roughly comprises a portable terminal 1, a processor main body 2, an external station 3, and a service server 4. The portable terminal 1 is coupled with the processor main body 2 to enable information exchange with each other. In addition, the portable terminal 1 and the external station 3 enable communication with each other via a short distance wireless equipment such as Bluetooth. A communication between the external station 3 and the service server 4 can be made each other via a public line network, for example.

Figure 2:
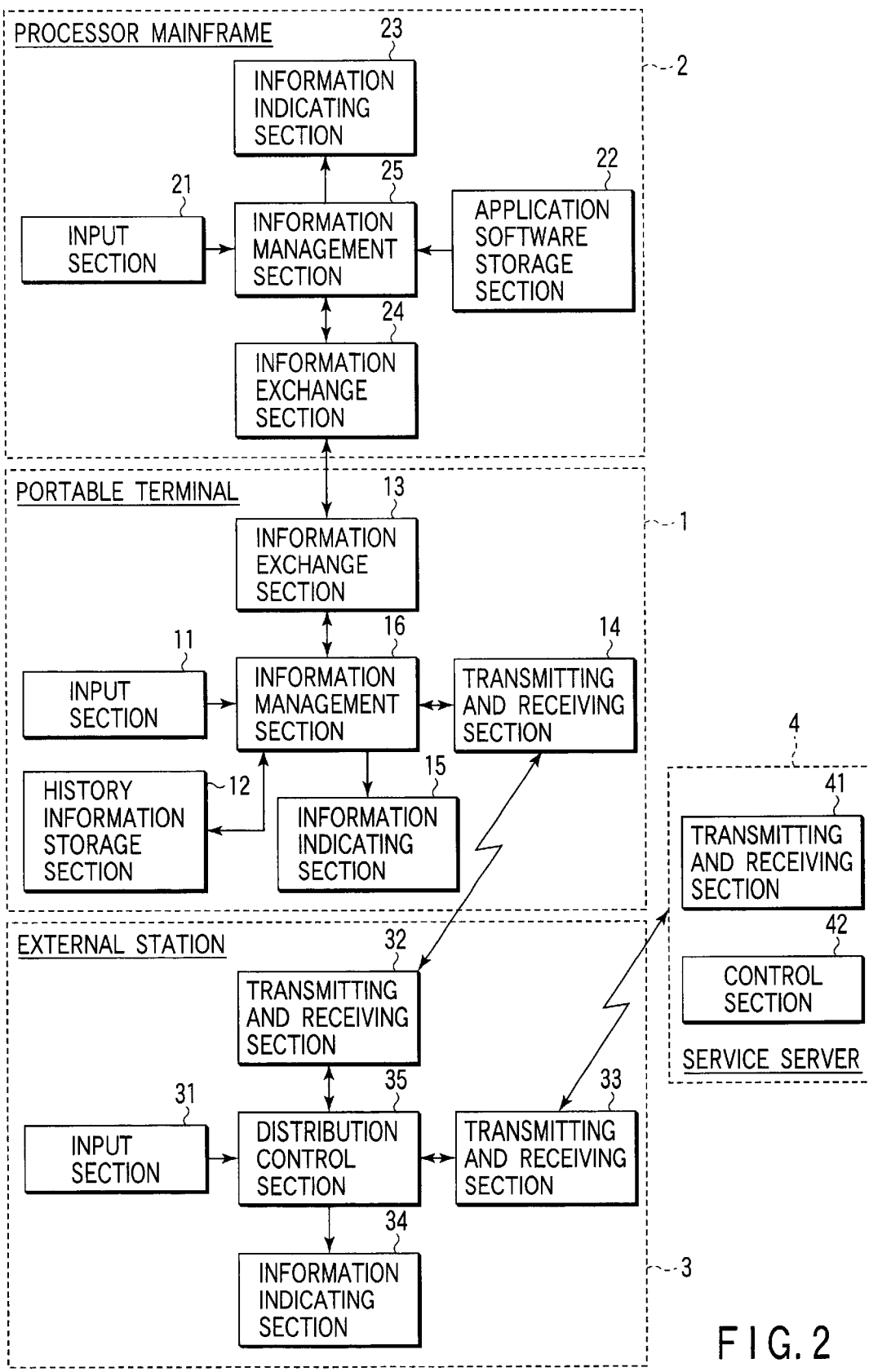
FIG. 2 is a block diagram depicting a detailed configuration of the service system according to the same embodiment.

Hereinafter, each of the sections shown in FIG. 1 will be described in detail with reference to FIG. 2.

[Portable Terminal 1]

A portable terminal 1 is a card type device of size suitable for a user to hold in hand, for example. This terminal consists of an input section 11, a history information storage section 12, an information exchange section 13, a transmitting and receiving section 14, an information presenting section 15, and an information management section 16. The input section 11 is intended to execute and control applications such as game for the processor main body 2. Specifically, the input section is composed of operating buttons.

The history information storage section 12 is intended to store history information dependent on a user who possesses a portable terminal. For example, the storage section is composed of a small-sized memory card in which EEPROM is employed for a storage medium. Here, the history information includes: information on the user's game history (game result, game execution time, game progress, or type of acquired game characters); information on coupon history (coupon acquisition history indicating type of acquired coupon or coupon application history indicating what type of acquired coupon the user made an application). Information on game characters or coupon is generally referred as service information.

The information exchange section 13 is intended to exchange information with the processor main body 2 with or without wires when the information exchange section is coupled with the processor main body by being inserted into a slot of the processor main body 2, for example. Specifically, this section supplies service information such as acquired game characters to the processor main body 2 or receives information concerning game processing progress or the like from the processor main body 2.

The transmitting and receiving section 14 is intended for data communication with the external station 3 by employing a short distant wireless equipment such as Bluetooth. Specifically, this section transmits history information stored in the history information storage section 12 to the external station 3 or receives service information such as game characters or coupon transmitted from the external station 3.

The information presenting section 15 is a display unit such as liquid crystal display device, for example. This section displays the contents of history information stored in the history storage section 12 or service information acquired game characters or coupon via the transmitting and receiving section 14 for user's check.

The information management section 16 controls exchange of various information with the aforementioned input section 11, history information storage section 12, information exchange section 13, transmitting and receiving section 14, and information presenting section 15, and manages the information exchanged with them.

[Processor Mainframe 2]

A processor mainframe 2 is a device that is installed at a game center or convenience store on street or at home and that executes a game or any other applications. When an application is directed to a game, the mainframe serves as a game machine mainframe. This processor mainframe 2 can be used by executing applications such as game even if it is not coupled with the portable terminal 1.

The processor main body 2 is composed of an application software storage section 22, an information presenting section 23, an information exchange section 24, and an information management section 25.

The input section 21 is intended to execute and operate applications such as game. For example, this section is composed of a game pad, a joystick and the like. The application software storage section 22 consists of: a storage medium such as CD-ROM, for example, that stores application software such as game software; and a drive unit such as CD-ROM drive that reads data on application software from this storage medium. The information presenting section 23 is intended to present the user with applications such as game to be executed. For example, this section is composed of a liquid crystal display.

The information exchange section 24 is intended to exchange information with or without wires via the portable terminal 1 and the information exchange section 13 by receiving the portable terminal 1 in, for example, a slot. Specifically, this section receives supply of service information such as game characters acquired from the portable terminal 1, and supplies information concerning game processing process or the like to the portable terminal 1.

The information management section 25 controls distribution of various information with the aforementioned input section 21, application software storage section 22, information presenting section 23, and information exchange section 24 and manages the information exchanged with them. Further, the information management section 25 determines an acquisition period of service information such as new game characters as described later. In the case of the acquisition period of service information, this section writes into the history information storage section 12 in the portable terminal 1 the attribute information represented by type of service information such as game characters as part of the history information.

[External Station 3]

An external station 3 is a service information distributing device that is installed at a retail shop or convenience store that sells storage media such as CD-ROM for storing application software such as game software, and that distributes service information such as game characters required for continuing a game to the portable terminal 1 that a user brings. This station is compatible with a station for downloading application software such as game software.

This external station 3 is composed of an input section 31, a transmitting and receiving section 32, a transmitting and receiving section 33, an information presenting section 34, and an information management section 35. The input section 31 is intended to input an instruction for distributing service information such as game characters. For example, this section consists of operating buttons, for example.

The transmitting and receiving section 32 makes communication with the transmitting and receiving section 14 in the portable terminal 1 via a short distance wireless equipment such as Bluetooth in order to receive history information stored in the history information storage section 12 from the portable terminal 1 that the user brings into the station 3 or in order to distribute service information such as game characters to the portable terminal 1.

Another transmitting and receiving section 33 is intended to make communication between the external station 3 and the service server 4 via a public line network, for example. Specifically, this section receives from the service server 4 the distribution of service information such as new game characters to be distributed from the external station to the user.

Further, the transmitting and receiving section 33 transmits to the service server 4 within an allowable range of the portable terminal 1 information or the like useful to distribute service information such as subsequent game characters from among the connection state of the portable terminal 1 that makes communication with the external station 3 relevant to the external station 3 or the history information stored in the history information storage section 12 in the portable terminal 1 that makes communication with the external station 3. This communication between the transmitting and receiving section 33 and a transmitting and receiving section 41 of the service server 4 is made via a network composed of a wired public line network or wireless public line network.

The information presenting section 34 is intended to present a state of distributing service information to the portable terminal 1. For example, this section is composed of a liquid crystal display or the like. A distribution control section 35 distributes various information to the aforementioned input section 31, transmitting and receiving section 32, transmitting and receiving section 33, and information presenting section 34, and manages the information exchanged with them.

[Service Server 4]

A service server 4 includes: a transmitting and receiving section 41 for making communication with a transmitting and receiving section 33 of an external station 3 via a public line network, for example; and a control section 42 for controlling distribution of service information such as game characters according to degree of regional congestion between the portable terminal 1 and the external station 3.

This service server 4 functions as a central server to distribute to the external station 3 the service information such as game characters to be distributed from the external station 3 to the portable terminal 1 in order to control distribution of service information such as game characters to the portable terminal 1; and to receive provision of history information or the like from the portable terminal 1 via the external station 3, thereby changing service activities.

The entire service system must not always be divided into the aforementioned portable terminal 1, processing mainframe 2, external station 3, and service server 4. For example, functions of the processing mainframe 2 may be integrated with the portable terminal 1 or the external station 3 and the service server 4 may be integrated with each other. Further, in particular, in the case where service information distributed to the portable terminal is directed to coupon, this system does not generally execute applications corresponding to a game in the case of game characters. Thus, what corresponds to the processing mainframe 2 is not always required.

Now, an operation of a service system according to the present embodiment will be described by way of example in which a game character is distributed as service information to a portable terminal 1. In this case, a processing mainframe 2 is directed to a game machine mainframe that exists at home or the like.

Figure 3:
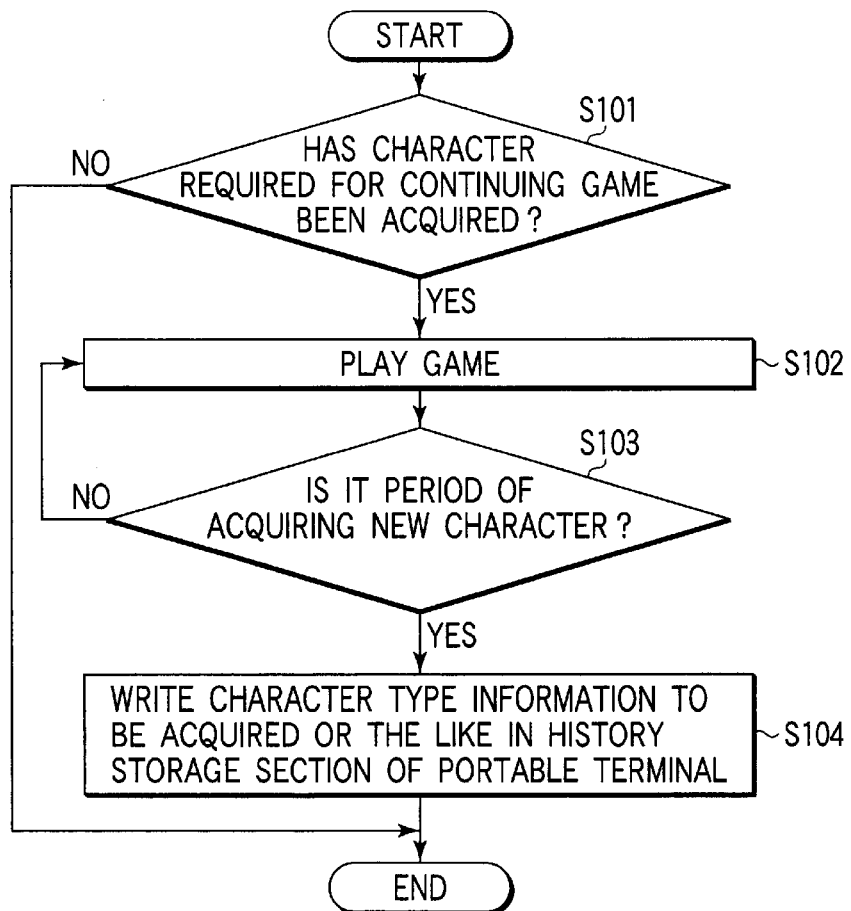
FIG. 3 is a flow chart showing procedures for writing history information into a history information storage section in a portable terminal according to the same embodiment.

FIG. 3 shows procedures for writing history information into a history information storage section 12 in a portable terminal 1 based on a game character acquisition state in the case where a user is playing a game by coupling the portable terminal 1 to a processing mainframe 2.

First, prior to starting a game, it is checked as to whether or not game characters required for continuing the game are acquired in an information management section 25 in the processing mainframe 2 (step S101). For example, in the case where an instruction is supplied to acquire a new game character at a time when a previous game is executed, if this game character is not acquired after a user has brought the portable terminal 1 into the external station 3, the game cannot be continued. When game characters are acquired for such continuation, the user can enjoy the game (step S102).

Next, at the information management section 25 in the processor main body 2, it is determined whether or not the portable terminal 1 should acquire a new game character from the external station 3 based on the history information already stored in the history information storage section 12 in the portable terminal 1, for example, information on user's game result or game execution time (step S103).

During this determination, the information on the executed game result or execution time is obtained by application software (game software) stored in the application software storage section 22 in the processor main body 2. The obtained information is captured from the information management section 25 in the processor main body 2 to the portable terminal 1 through the information exchange section 24. In this manner, at the portable terminal 1, these items of information are written into the history information storage section 12 via the information exchange section 13 and the information management section 16.

Although there is a variety of rules on determination of the acquisition period, the following rule can be employed as an example.

$$\text{Game result} \times \text{game execution time} > \alpha$$

That is, a product between the game result and the game execution time exceeds a threshold $\alpha$, it is determined that the acquisition period of a new game character has come. This means that, if the game result is good, the acquisition period of a new character has come within a short time of game execution, and if the game result is bad, the acquisition period of a new game character has come by the user playing the game over a long time.

As a result of the determination of the acquisition period of a new game character, in the case where such acquisition time has not come yet, it returns to the step S102 to continue the game. In the case where such acquisition time has come, it goes to step S104. At this step, attribute information such as type of service information including game characters to be acquired is written as history information into the history information storage section 12 via the information exchange section 24 and the information exchange section 13 and information management section 16 in the portable terminal 1. In addition,.an instruction of acquiring game characters is indirectly performed by application software (game software) stored in the application software storage section 22 in the processor main body 2.

When an instruction is thus supplied to acquire a new game character, the user first goes to the nearest external station 3 with the portable terminal 1. In a state in which communication between the portable terminal 1 and the external station 3 is enabled via the transmitting and receiving section 14 an d the transmitting and receiving section 32 by means of short distance wireless equipment such as Bruetooth, for example, when a distance between them is within 10 m, service information such as game characters is distributed along the flow of operation as shown in the flow chart in FIG. 4, for example.

Figure 4:
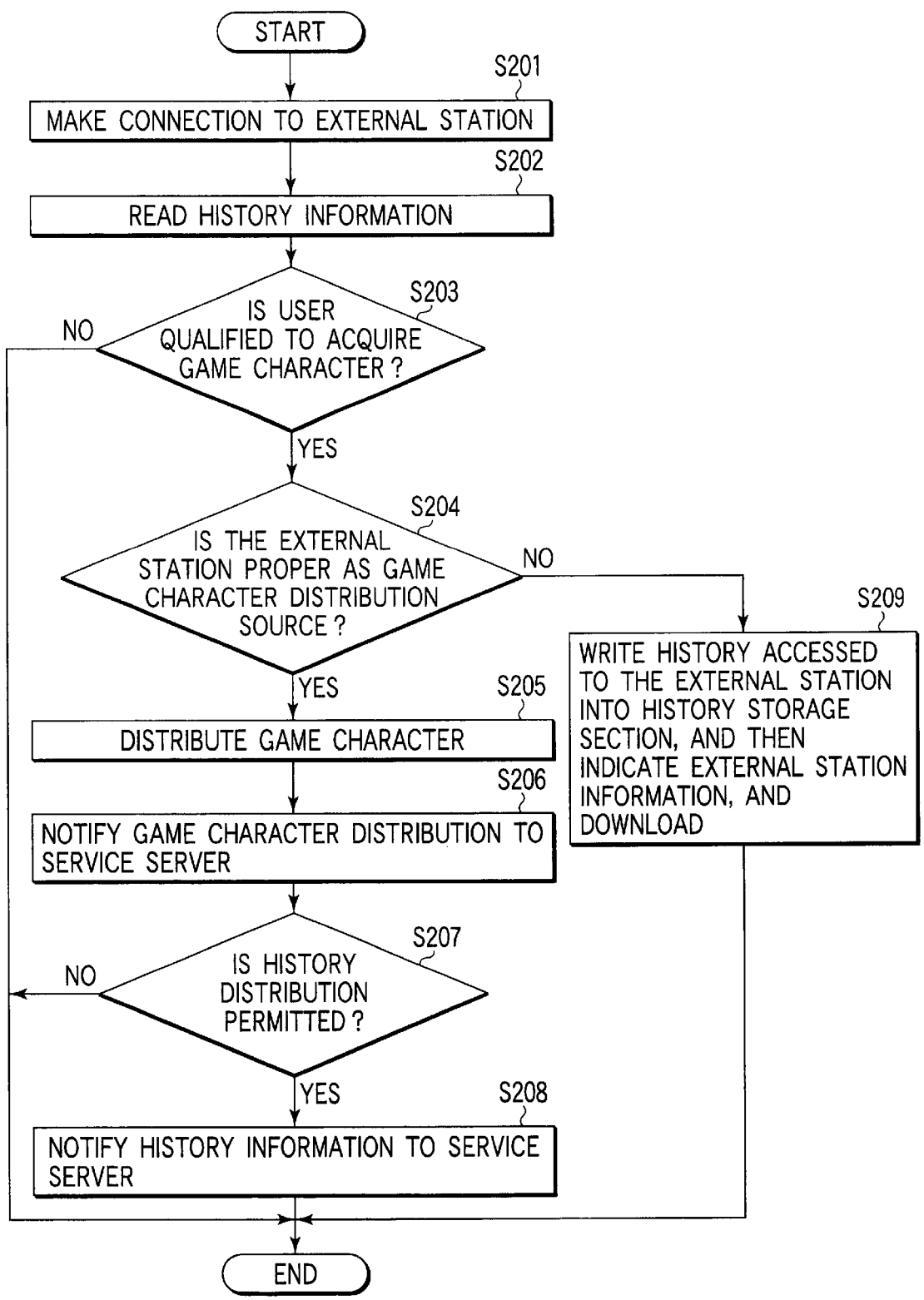
FIG. 4 is a flow chart showing procedures for distributing a game character based on history according to the same embodiment.

Referring now to FIG. 4, in a state in which the portable terminal 1 is connected to the external station 3, namely, in a state in which communication is enabled when a distance between the portable terminal 1 and the external station 3 reaches the range of enabling short distance wireless communication (step S201), a distribution control section 35 in the external station 3 determines that communication with the portable terminal 1 is thus enabled from a reception state of the transmitting and receiving section 32. The distribution control section 35 reads and fetches history information from the history information storage section 12 via the transmitting and receiving section 32 and the transmitting and receiving section 14 and information management section 16 in the portable terminal 1 (step S202).

The distribution control section 35 determines whether or not the user of the portable terminal 1 is qualified to acquire a new game character from the fetched history information (step S203). The determination of whether or not the user is qualified to acquire such game character is performed by determining whether or not the progress of a game reaches a predetermined stage or whether or not the level of game characters appearing in the game reaches a predetermined level. If it is determined that the user is not qualified to do that, processing terminates. In this case, the current step goes to another step, for example, game purchase processing. These steps are irrelevant to the scope of the present invention, a description of which is omitted here.

At the step S203, when it is determined that the user is qualified to acquire the game character, the distribution control section 35 continuously determines whether or not the external station 3 is proper as a distribution source of the game character (step S204). This is because an arrangement is provided such that the user cannot acquire a game character as long as a plurality of external stations are accessed, in order to provide game-like entertainment to game character distribution itself.

Specifically, in the case where an arrangement is provided such that a new game character cannot be acquired as long as a plurality of external stations are accessed, there is recorded in the history information storage section 12 in the portable terminal 1 the number of external stations that the portable terminal 1 has accessed as part of the history information by type of game character as shown in FIG. 5A, namely, the number of external stations that were connected at the step S201. The distribution control section 35 determines whether or not the user is qualified to acquire a game character based on the number of thus accessed external stations.

By further referring to FIG. 5A, $\alpha 1$, $\alpha 2$, $\alpha 3$, . . . are described in a field for type of game character to be acquired. Of these descriptions, $\alpha 1$ denotes a type of game character that the user was already qualified to acquire. In a field for the date of qualification, there is described the date when the user was qualified to acquire character type of $\alpha 1$ (Oct. 27, 1999). In a field for the number of accessed external stations, there is stored the number of external stations (2 in this example) that have been accessed on and after the date.

Of these items of history information, character type to be acquired and the date of qualification (including time in more detail) are written into the history information storage section 12 in the portable terminal 1 coupled with this processor main body 2 when the user plays a game at the processing mainframe 2, namely, when the processing of the step S104 is performed. The number of characters instructed for acquisition is not always one. In addition, if the user is playing another game, there is a case in which the user is instructed to acquire a plurality of game characters. The number of accessed external stations is incremented every time the portable terminal 1 makes communication with the external station 3.

As shown in FIG. 5B, a list of accessed external stations as well as the number of external stations may be stored in the history information storage section 12 in the portable terminal 1. In this field for the list of external stations, for example, (P1, P2) is stored. This (P1, P2) may be an identification number of accessed external station 3 or may be a position (for example, longitude and/or latitude) at which the external station 3 exists.

The distribution control section 35 makes it possible to add game-like entertainment such that a bonus point is further provided to the portable terminal 1 depending on the identification numbers or positions in the accessed external station list thus stored in the history information storage section 12. For example, a variety of game-like entertainment factors can be added, for example, such that the tail ends of identification numbers are in the same number or a shape similar to star, rectangle or character contour is formed by connecting positions. These factors are unlikely to occur when the user plays a game at home. By positively employing the above factors, there can be provided an arrangement such that the user becomes active by leaving a game machine at home or the user is invited to visit regional shop.

By referring now to FIG. 4 again, when an external station 3 is accessed at the step S204, in the case where the external station is not proper as a distribution source of a game character, for example, if the predetermined number of external stations cannot be accessed at this time, processing goes to the step S209. At the step S209, the number of external stations that were accessed in FIG. 5A and FIG. 5B, the external stations being stored in the history information storage section 12, is incremented by 1. Further, if the contents of the history information storage section 12 are as shown in FIG. 5B, the identification number or position of currently accessed external station is added to the external station list. Then, how many external stations should be accessed is indicated, and processing terminates. In addition, if another specific external station 3 needs to be accessed, navigation information such as route to the external station 3 is downloaded to the portable terminal 1, and processing terminates.

On the other hand, at the step S204, in the case where the accessed external station 3 is proper as a distribution source of a game character, namely, in the case where the number of external stations to be accessed has been met at a time when the above external station 3 is accessed, processing goes to the step S205. At this step, a game character is distributed from the external station 3 to the portable terminal 1.

After this game character has been distributed, the external station 3 notifies the information on distribution of the game character from the transmitting and receiving section 33 to the service server 4 via a public line network, for example (step S206). At the service server 4, this notification is received by the transmitting and receiving section 41, and is checked there.

Further, if the history information stored in the history information storage section 12 includes history information on which the user specifies that external distribution is permitted (step S207), the external station 3 notifies the history information from the transmitting and receiving section 33 to the service server 4 via a public line network, for example (step S208). Then, at the service server 4, the thus notified history information is received by means of the transmitting and receiving section 41.

Although not shown in the flow chart in FIG. 4 in particular, at a control section 42 in the service server 41, it is possible to dynamically change a distribution method based on the history information (including game character distribution information) notified from the external station 3.

For example, in the case where an access to a specific external station (referred to as 3A) is heavily congestive, when the portable terminal 1 provides an access to the other external stations (referred to as 3B and 3C) in the vicinity of such station, the control section 42 estimates "the number of accessed external stations" stored as history information shown in FIG. 5A and FIG. 5B by weighting it twice of "the number of accessed external stations" stored as history information when such congestive external station 3A is accessed. Then, the control section directly notifies the information on such estimation from the service server 4 to the portable terminal 1 via a public line, for example.

By doing this, the user who possesses the portable terminal 1 determines that it is better to visit the external station 3B or 3C in order to acquire service information such as game characters easily and advantageously, thus resulting in efficient reduction of congestion.

In addition, it is possible to present the user who possesses the portable terminal 1 with a desired external station 3 by using the following method. First, identification information (character distribution location ID) indicating a location (external station) at which each game character is obtainable is described in the application software (game software) stored in the application software storage section 22 in the processor main body 2. This character distribution location may not be information intuitively indicating individual external stations.

When an instruction is supplied to acquire a game character, the character distribution location ID corresponding to that game character is captured from the information management section 25 in the processor main body 2 to the portable terminal 1 through the information exchange section 24. Then, at the portable terminal 1, the captured location ID is inputted to the information management section 16 via the information exchange section 13. At the history information storage section 12, there is provided a table showing a correlation between character distribution location ID and actual distribution location. When the information management section 16 receives a character distribution location ID, an external station name or the name of store in which the external station is placed and the like is displayed on the information presenting section 15 based on this correlation table. In this manner, the user can recognize an external station at which a desired game character is obtainable.

At the control section 42, there may be computed statistical data including reference information such as next planning of game to be developed or distributed or planning of game characters to be distributed by employing notified history information.

In addition, at the control section 42, in addition to the purpose of reducing congestion as described above, it is possible to perform control such that an instruction is supplied for user to gather at a specific external station, for example, thereby promoting sales such as other commodities handled at shop at which the external station is placed.

Specifically, there may be employed a method for increasing the number of permissible accesses to an external station that should be attractive to users (increasing a weight coefficient concerning access count) or a method for directly specifying for the portable terminal 1 an external station at which a game character should be acquired, thereby guiding the user to visit that external station.

Further, the control section 42 dynamically changes the distribution price of a game character according to the external station 3 (dynamic pricing), and notifies such change to the portable terminal 1, thereby making it possible to further accelerate sales promotion.

Furthermore, the control section 42 performs control such that, if a game character is acquired via a correct route (namely, via a list of accessed external stations), the game character purchase price is reduced, whereby making it possible to further prompt the user to acquire such game character.

(Other Application Examples)

In the aforementioned description of operation, although a description has been given by way of example of game character acquisition, the present embodiment is not limited thereto, and a variety of applications can occur as follows.

(1) As service information, a stamp is distributed instead of a game character, and an external station 3 is placed at station instead of shop, thereby making it possible to provide new service in which stamp rally performed during summer vacation and home-use game are combined with each other.

(2) As service information, there is distributed a hint or evidence required for reasoning or solving a mystery instead of a game character, and an external station is placed at hotel or in train instead of shop, thereby making it possible to provide service as a new electronic mystery drama.

(3) As service information, medicine is distributed instead of a game character or user's hobby (for example, classical music) is distributed instead of a game, whereby, when the user must take medicine every predetermined period of time, arrangement can be provided such that the user cannot continuously listen to a desired music without an evidence that the user took medicine (corresponding to game character acquisition) (for example, unless a button indicating that the user took medicine is selected).

The portable terminal 1 makes communication with the external station 3 by means of short distance wireless equipment such as Bluetooth. Thus, such action of taking medicine that the user is comparatively likely to neglect at home can be executed continuously, which is efficient.

(4) In addition, as mentioned previously, the present invention is applicable to a case in which coupon information or the like is provided as service information instead of a game character. A specific example will be described in detail by way of the following embodiments.

(Second Embodiment)

Figure 6:
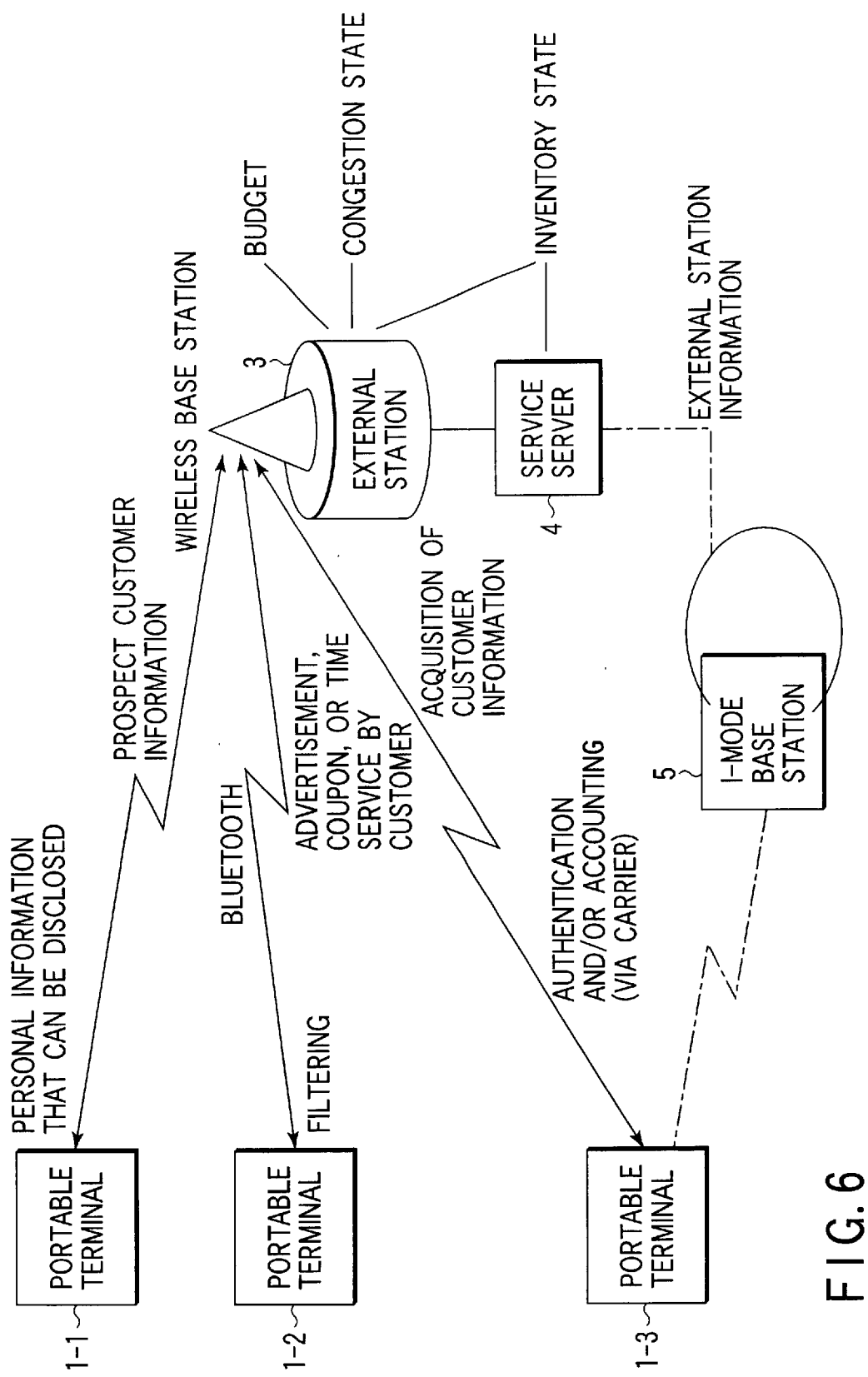
FIG. 6 is a view showing a schematic configuration of a service system employing a portable terminal according to a second embodiment.

FIG. 6 shows an example of a service system employing a portable terminal according to a second embodiment of the present invention, wherein the portable terminal receives distribution of coupon information or the like as service information from an external station. Portable terminals 1-1, 1-2, and 1-3 are configured in the same way as the portable terminal 1 described in the first embodiment, and external station 3 and service server 4 have basically the same configuration as in the first embodiment as well. In addition, in the present embodiment, the processor main body 2 described in the first embodiment is not required.

In FIG. 6, there is shown the contents of information exchanged between each of the portable terminals 1-1, 1-2, and 1-3 and the external station 3 by means of communication employing a short distance wireless equipment such as Bluetooth or the content of processing at the external station 3 and the service server 4.

For example, from a portable terminal 1-1, there is read history information such as personal information that the user possessing the terminal can disclose to the outside, for example, age, gender, address, or history of purchase from a history information storage section 12. These items of information are supplied as prospect customer information to the external station 3. In addition, the history information read from the history information storage section 12 of another portable terminal 1-2 is filtered (for example, the user's preference is determined from the history information). For example, the information such as favorite games of the user who possesses the portable terminal 1-2 is transmitted to the external station 3.

On the other hand, the external station 3 distributes to the portable terminals 1-1, 1-2, and 1-3 the service information including advertisement, coupon, and time service of commodities for sale by customer by means of communication equipment. The external station 3 determines the type, quantity, or price of commodities for sale according to the inventory state or budget of each commodity or determines the contents of the presence or absence, time intervals, or contents of coupon issues and time service (for example, service for selling commodities that must be sold by a predetermined time from the viewpoint of expiration such as foods at supermarket or the like by discounting it after a predetermined time has expired).

In addition, the external station 3 acquires customer information including application for purchase commodities or the like and the name and code number of available credit card from the portable terminal 1-3, and performs authentication and accounting (credit card settlement or the like) based on such customer information via a carrier (not shown).

Further, between each of the portable terminals 1-1, 1-2, and 1-3 and the service server 4, it is possible to directly transmit and receive information concerning the external station 3 via a public telephone line such as portable cellular phone network through Internet service via portable phone, for example i-mode base station. This communication route is employed to notify any kind of information for inviting a user from the service server 4 to the portable terminals 1-1, 1-2, and 1-3 (information on the number of accessed external stations in which aforementioned weighting was applied) in order to change a method for dynamically distributing service information based on the history information notified from the external station 3 at the control section 42 in the service server 4, as described previously in the first embodiment, for example.

In the present embodiment, there is described an example when coupon information is distributed as service information from the external station 3 to the portable terminals 1-1, 1-2, and 1-3.

For example, in coupon information, there is included the privilege information such that a discount rate is increased when a user of a portable terminal who has acquired coupon information passes through a shop (external station 3) in order along such coupon information. Such new purchase service method is implemented, thereby causing users to gather in a specific area such as street or shopping mall, resulting in regional prosperity.

In addition, there is included in coupon information the privilege information such that, when a user visits museums or art galleries and the like at a scenery spot and encounters a turn in which coupon information is distributed, the user can acquire a souvenir in front of station, thereby inventing the user to these museums or art galleries.

(Third Embodiment)

Figure 7:
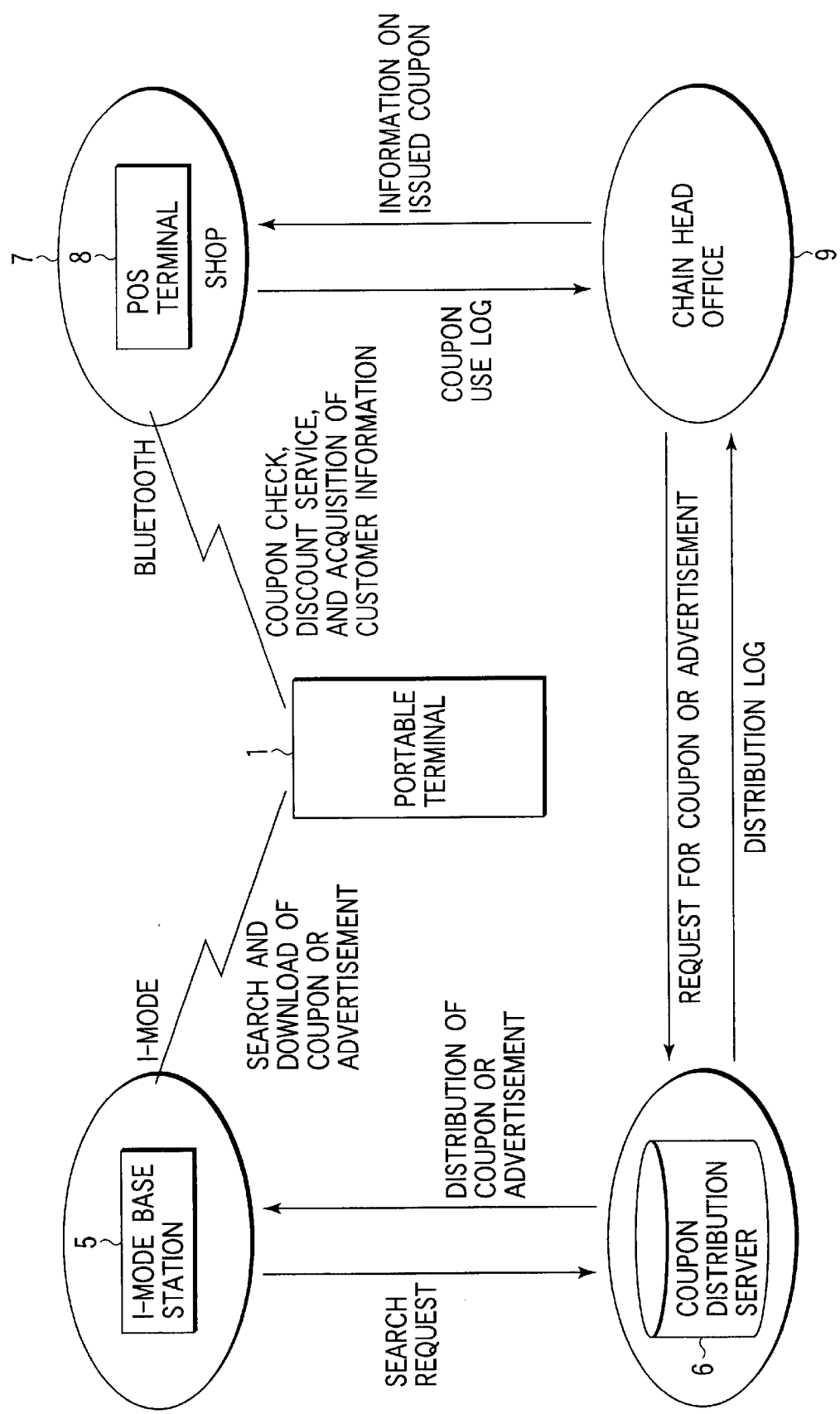
FIG. 7 is a view showing a service system employing a portable terminal according to a third embodiment.

FIG. 7 shows still another example of a configuration when a service system employing a portable terminal according to a third embodiment of the present invention is applied to a coupon distribution system.

In the present embodiment, a coupon distribution server 6 is provided, from which coupon or advertisement information is distributed to a portable terminal 1 via a public telephone line such as portable cellular phone network through an i-mode base station 5, for example. Specifically, when the portable terminal 1 issues a request for searching a coupon or advertisement, this search request is notified to a coupon distribution server 6 via the i-mode base station 5. Upon receipt of this request, the coupon distribution server 6 distributes the requested coupon or advertisement information to the i-mode base station 5. The requested information is downloaded at the history information storage section 12 in the portable terminal 1. When the user who possesses the portable terminal 1 acquires coupon information and registers an application for coupon properly by referring to such downloaded coupon and advertisement information, the fact is registered in the history information storage section 12.

Next, when the user who has registered such application for coupon visits an available shop 7 that handles such coupon, it is possible to make communication between the portable terminal 1 and a POS terminal 8 installed at the shop 7 by employing a short distance wireless equipment such as Bluetooth, for example. Then, the coupon for which the user has registered an application is actually acceptable via the POS terminal 8, and coupon check, providing discount service, or acquisition of customer information is performed.

The shop 7 constitutes chain shops. After a chain shop head office 9 has issued a request for a coupon or advertisement to the coupon distribution server 6, and the coupon distribution server 6 distributes the coupon, a distribution log indicating the fact is notified to the chain shop head office. Further, the chain shop head office 9 makes a request for a coupon to the coupon distribution server 6, the information on such distributed coupon (issued coupon) is notified to the shop 7. When the shop 7 receives the user application for a coupon, the coupon use log indicating the fact is notified to the chain shop head office 9.

(Fourth Embodiment)

Figure 8:
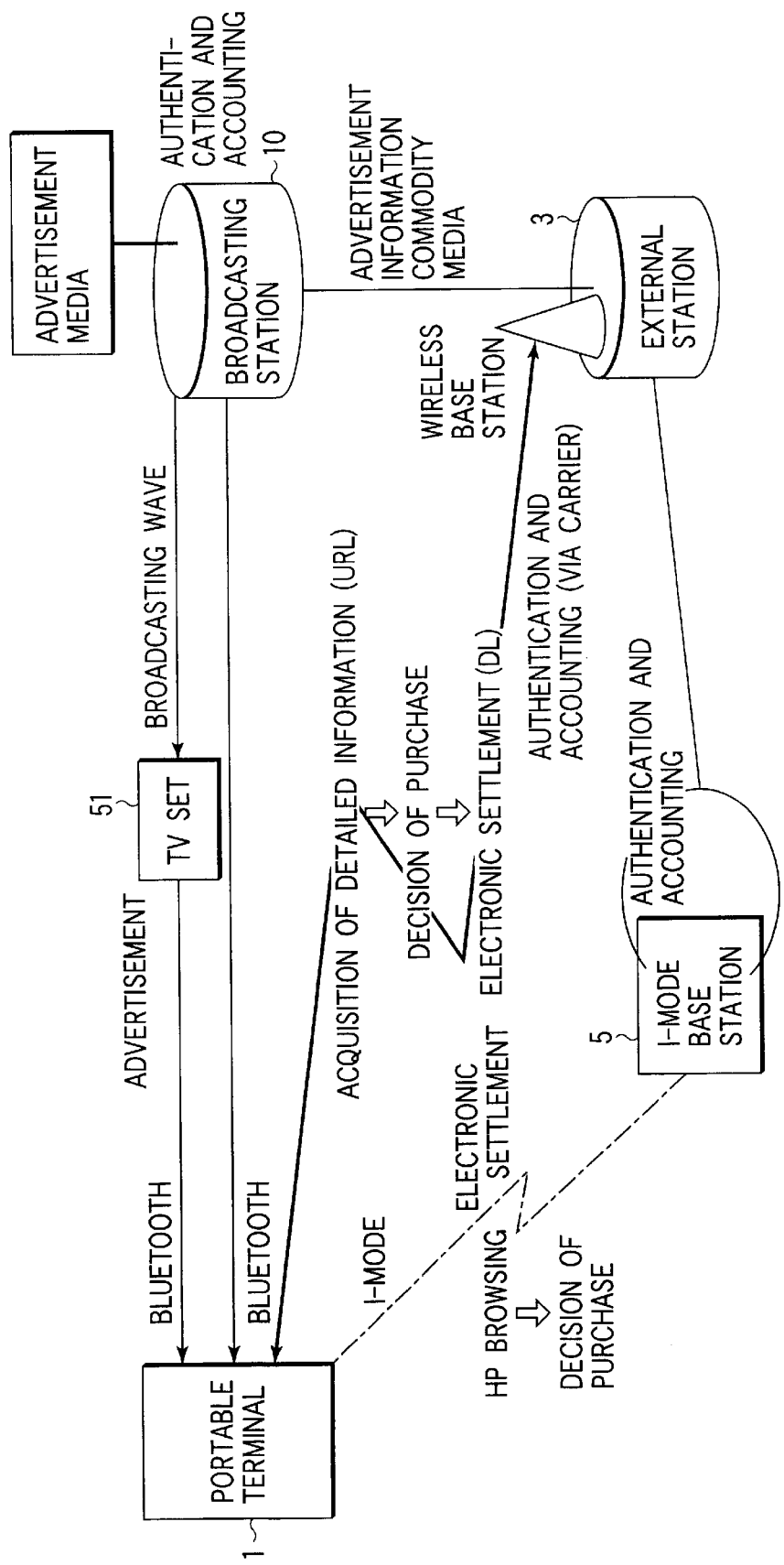
FIG. 8 is a view showing a service system employing a portable terminal according to a fourth embodiment.

FIG. 8 shows a service system employing a portable terminal according to a fourth embodiment of the present invention, wherein a broadcasting station 10 for broadcasting advertisement information simultaneously to a number of portable terminals is added. This broadcasting station can take two types of modes. A first mode is a broadcasting station that transmits a broadcasting electric wave to a digital television receiver 51. In this case, the television receiver 51 transmits the advertisement information received from the broadcasting station to a portable terminal by employing Bluetooth. A second mode is a local broadcasting station that transmits (broadcasts) advertisement information directly to a portable terminal 1 by using Bluetooth.

FIG. 9 shows the portable terminal 1 and external station 3 shown in FIG. 8 and a service server 4 not shown in FIG. 8 in detail.

A local broadcasting station 10 is installed in the building of railway station or the like, for example, and transmits local specific advertisement information or the like to be superimposed on the broadcasting waves. In addition, the broadcasting station 10 may be compatible with radio broadcasting station such as local FM station. Such advertisement information includes coupon information, for example.

A broadcast receiving section 17 for receiving broadcasting waves from the broadcasting station 10 is newly added to the portable terminal 1 as shown in FIG. 9. The receiving signal from this broadcasting receiving section 17, namely, advertisement information is transmitted to an information management section 16. The other configuration of the portable terminal 1 and the configurations of the external station 3 and service server 4 are similar to those shown in FIG. 2 described in the first embodiment.

At the portable terminal 1, the advertisement information received by the broadcast receiving section 17 is transmitted to an information presenting section 13 via the information management section 16, and is displayed there. When a user who possesses the portable terminal 1 sees the display at this information presenting section 13, and attempts to utilize the advertisement information, these items of information are stored in a history information storage section 12 by inputting an instruction by means of the input section 11. The thus stored information is utilized in the same way as that described in the second embodiment.

As has been described above, according to the present embodiment, broadcasting waves are used for distributing advertisement or coupon information or the like, whereby advertisement information can be distributed to a number of users inexpensively, and cost required for sales promotion of shops that exist in a local area can be significantly reduced.

According to the present invention, various modifications can occur without limiting to the aforementioned embodiments. For example, a service system in which the first to fourth embodiments are combined with each other may be constructed. Service information is not limited to information on game characters, coupons, or advertisement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A service system comprising:
    a portable terminal device configured to execute a game solely or in collaboration with a game machine mainframe, said portable terminal device including,
        a portable terminal communication section configured to communicate with an external station,
        a portable terminal storage section configured to store game history and character information depending on a user that possesses the portable terminal device,
        a portable terminal information management section configured to read the game history and character information stored in said storage section, transmit the game history information to said external station, and receive additional game character information from said external device;
    a game machine mainframe including,
        a mainframe information exchange section configured to exchange information with the portable terminal device, and
        a mainframe information management section configured to write attribute information represented by type of service information into a storage section in the portable terminal device as part of history information;
    an external station including,
        an external station communication section configured to communicate with the portable terminal device when said portable terminal device is within a predetermined distance, and
        an external station distribution control section configured to receive the game history and character information transmitted from said portable terminal and distribute said additional game character information to said portable terminal device according to the received game history information; and
    a central service server configured to provide the service information to the external station on the basis of the game history and character information received by the external station from the portable terminal device.

2. The system according to claim 1, wherein said portable terminal device or game machine mainframe includes a section configured to, when a predetermined condition is met, instruct a user to acquire service information, said game character information, or coupon information.

3. The service system according to claim 1, wherein said portable terminal device or game machine mainframe includes a section configured to indicate a user said external station at which said portable terminal device acquires service information, said game character information, or coupon information.

4. The system according to claim 1, wherein said external station includes a section configured to transmit to said portable terminal device, guidance information for indicating another external station at which said portable terminal acquires service information, said game character information, or coupon information.

5. The system according to claim 1, wherein said external station includes a section configured to transmit to said portable terminal device, guidance information for indicating another external station at which said portable terminal acquires service information, said game character information, or coupon information.

6. A service method in a service system comprising a portable terminal device configured to acquire game character information to and execute a game solely or in collaboration with a game machine mainframe, a game machine mainframe including both an information exchange section configured to exchange information with the portable terminal device and an information management section configured to write attribute information represented by type of service information into a storage section in the portable terminal device as part of history information, an external station configured to communicate with the portable terminal when the portable terminal is within a predetermined distance, and a central service server configured to provide to the external station the attribute information to be distributed to said portable terminal device, said service method comprising the steps of:
    storing history information depending on a user that possesses said portable terminal device in said portable terminal device;
    exchanging information between said portable terminal device and said game machine main frame;
    transmitting said stored history information to said external station in said portable terminal;
    receiving the transmitted history information at said external station; and
    transmitting said game character information to said portable terminal device according to said received history information from said external station and in accordance with information provided by said central service server.

* * * * *